United States Patent
Roskind

(10) Patent No.: US 9,729,654 B1
(45) Date of Patent: *Aug. 8, 2017

(54) REDUCTION IN REDIRECT NAVIGATION LATENCY VIA SPECULATIVE PRECONNECTION

(71) Applicant: Google Inc., Mountain View, CA (US)

(72) Inventor: James Roskind, Redwood City, CA (US)

(73) Assignee: Google Inc., Mountain View, CA (US)

(*) Notice: Subject to any disclaimer, the term of this patent is extended or adjusted under 35 U.S.C. 154(b) by 355 days.

This patent is subject to a terminal disclaimer.

(21) Appl. No.: 14/529,301

(22) Filed: Oct. 31, 2014

Related U.S. Application Data

(63) Continuation of application No. 13/598,345, filed on Aug. 29, 2012, now Pat. No. 8,903,946.

(60) Provisional application No. 61/551,275, filed on Oct. 25, 2011.

(51) Int. Cl.
| | | |
|---|---|---|
| *G06F 15/16* | (2006.01) | |
| *H04L 29/08* | (2006.01) | |
| *H04L 29/06* | (2006.01) | |
| *G06F 17/30* | (2006.01) | |
| *H04L 29/12* | (2006.01) | |
| *G06F 12/00* | (2006.01) | |

(52) U.S. Cl.
CPC .... *H04L 67/2814* (2013.01); *G06F 17/30887* (2013.01); *H04L 29/08072* (2013.01); *H04L 61/1511* (2013.01); *H04L 67/42* (2013.01)

(58) Field of Classification Search
CPC ......... G06F 17/30598; G06F 17/30867; G06F 17/30699; G06F 17/30702; G06F 17/30864; G06F 17/30873; G06F 17/30902; G06Q 10/10; G06Q 30/02; G06Q 30/00; G06Q 30/0251; G06N 5/02
USPC .................. 709/217, 203, 218, 223–229, 250
See application file for complete search history.

(56) References Cited

U.S. PATENT DOCUMENTS

| | | |
|---|---|---|
| 6,023,726 A | 2/2000 | Saksena |
| 6,041,357 A | 3/2000 | Kunzelman et al. |
| 6,055,572 A | 4/2000 | Saksena |
| 6,067,565 A | 5/2000 | Horvitz |
| 6,085,226 A | 7/2000 | Horvitz |
| 6,182,133 B1 | 1/2001 | Horvitz |

(Continued)

OTHER PUBLICATIONS

U.S. Appl. No. 13/175,715, "Latency Reduction Via Adaptive Speculative Preconnection," to Roskind et al., filed Jul. 1, 2011.

*Primary Examiner* — Zarni Maung

(74) *Attorney, Agent, or Firm* — McDermott Will & Emery LLP

(57) ABSTRACT

Methods, systems, and computer storage mediums for reducing navigation redirect latency by using speculative preconnection. A redirect speculation value is retrieved in response to a request for a source Uniform Resource Locator (URL), where the redirect speculation value is based on the source URL. The redirect speculation value includes the source URL, a target URL, and a probability factor. A preconnection to the target URL's hostname is then initiated based on the probability factor. Next, a response from the request to the source URL is received, where the response includes a redirect URL. Finally, the preconnection is used to process the redirect URL when the redirect URL is similar to the target URL.

20 Claims, 5 Drawing Sheets

(56) References Cited

U.S. PATENT DOCUMENTS

| | | |
|---|---|---|
| 6,366,947 B1 | 4/2002 | Kavner |
| 6,604,103 B1 | 8/2003 | Wolfe |
| 6,757,738 B1 | 6/2004 | Cao et al. |
| 7,024,466 B2 | 4/2006 | Outten et al. |
| 7,047,485 B1 | 5/2006 | Klein et al. |
| 7,103,594 B1 | 9/2006 | Wolfe |
| 7,113,935 B2 | 9/2006 | Saxena |
| 7,302,465 B2 | 11/2007 | Ayres et al. |
| 7,437,438 B2 | 10/2008 | Mogul et al. |
| 7,483,941 B2 | 1/2009 | Carlson et al. |
| 7,558,748 B2 | 7/2009 | Ehring et al. |
| 7,584,500 B2 | 9/2009 | Dillon et al. |
| 7,716,332 B1 | 5/2010 | Topfl et al. |
| 7,747,749 B1 | 6/2010 | Erikson et al. |
| 7,908,336 B2 | 3/2011 | Carlson et al. |
| 7,921,117 B2 | 4/2011 | Saxena |
| 7,941,609 B2 | 5/2011 | Almog |
| 7,975,025 B1 | 7/2011 | Szabo et al. |
| 7,987,431 B2 | 7/2011 | Santoro et al. |
| 8,341,245 B1 | 12/2012 | Roskind et al. |
| 8,903,946 B1 * | 12/2014 | Roskind ............ G06F 17/30902 709/217 |
| 2002/0111967 A1 | 8/2002 | Nagase |
| 2004/0003287 A1 | 1/2004 | Zissimopoulos et al. |
| 2005/0065870 A1 | 3/2005 | Yu |
| 2005/0102394 A1 | 5/2005 | Loveland |
| 2006/0036966 A1 | 2/2006 | Yevdayev |
| 2009/0031040 A1 | 1/2009 | Jayawardena et al. |
| 2009/0112975 A1 | 4/2009 | Beckman et al. |
| 2009/0228438 A1 | 9/2009 | Dasgupta et al. |
| 2010/0146415 A1 | 6/2010 | Lepeska |
| 2010/0281224 A1 | 11/2010 | Ho et al. |
| 2011/0134062 A1 | 6/2011 | Chiba et al. |
| 2011/0191342 A1 | 8/2011 | Cohen et al. |
| 2011/0276561 A1 | 11/2011 | Dulitz et al. |
| 2011/0320518 A1 | 12/2011 | Tsui et al. |
| 2012/0323838 A1 | 12/2012 | Ulinski et al. |

* cited by examiner

REDUCTION IN REDIRECT NAVIGATION LATENCY VIA SPECULATIVE PRECONNECTION

BACKGROUND

The delay associated with processing redirect events experienced by navigating to webpages may create an undesirable user experience. The embodiments described herein can reduce latency experienced in redirect navigation by anticipating redirect events and speculatively preconnecting to the webpage indicated in the redirect event.

BRIEF SUMMARY

The embodiments described below include systems, methods, and computer storage mediums for reducing navigation redirect latency by using speculative preconnection. A redirect speculation value is retrieved in response to a request for a source Uniform Resource Locator (URL), where the redirect speculation value is based on the source URL. The redirect speculation value includes the source URL, a target URL, and a probability factor. A preconnection to the target URL's hostname is then initiated based on the probability factor. Next, a response from the request to the source URL is received, where the response includes a redirect URL. Finally, the preconnection is used to process the redirect URL when the redirect URL is similar to the target URL for reducing navigation redirect latency by using speculative preconnection.

Further features and advantages of this invention described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
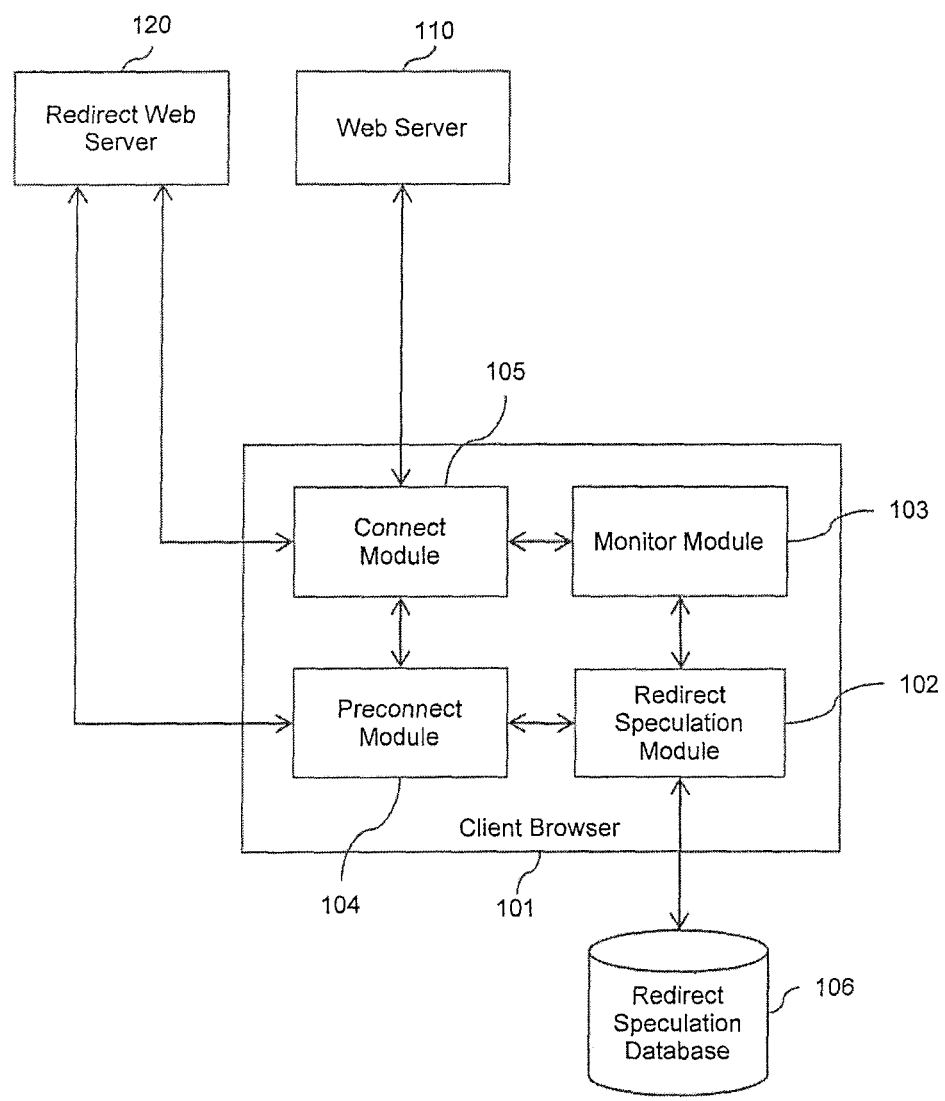
FIG. 1 is an example system environment that may be used to reduce redirect latency by speculatively preconnecting to a URL's hostname.

In the following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

The embodiments and accompanying figures described below generally relate to reducing latency in website navigation. In one embodiment, a user, via a client browser, visits a source Uniform Resource Locator ("URL") and the source URL sends the client browser a redirect URL. The client browser can associate the source URL with the redirect URL and store the association. The next time the browser detects a visit to the source URL, the browser can retrieve the previously stored redirect URL, now a target URL, and preconnect to the target URL's hostname in anticipation of being redirected by the source URL. The preconnection to the target URL's hostname can occur at the same time the request to the source URL is being processed. Then, if the source URL returns a redirect event that includes a redirect URL, with the same hostname as the target URL, the preconnection can be used to process the request to the redirect URL.

In the embodiments described herein, the term "hostname" is taken to mean both the Domain Name System ("DNS") resolvable textual name of a host, such as "www.google.com," as well as, optionally, a port (i.e., port 80, port 443, or port 5000), and a scheme (i.e., Hypertext Transfer Protocol ("HTTP"), Hypertext Transfer Protocol Secure ("HTTPS"), or File Transfer Protocol ("FTP")).

This Detailed Description is divided into sections. The first section describes example system embodiments that may be used reduce latency in redirect navigation through speculative preconnection. The second section describes a method currently used in the art for processing URL requests. The second section also describes a method, according to one embodiment, for processing URL requests in order to reduce latency in redirect navigation through speculative preconnection. The third section describes example method embodiments for reducing latency in redirect navigation through speculative preconnection, according to embodiments of the present invention. The fourth section describes an example computer system that may be used to carry out the embodiments described herein.

Example System Embodiments

FIG. 1 is an example system environment 100 that may be used to reduce redirect latency by speculatively preconnecting to a URL hostname. System 100 includes client browser 101. Client browser 101 includes redirect speculation module 102, monitor module 103, preconnect module 104, and connect module 105. System 100 also includes redirect speculation database 106 that is connected to redirect speculation module 102. System 100 further includes web server 110 and redirect web server 120 that are coupled to client browser 101 via one or more networks.

Client browser 110 can run on any computing device. Similarly, web server 110 and redirect web server 120 can be implemented using any computing device capable of serving data to the client. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Such a computing device may include software, firmware, hardware, or a combination thereof. Software may include one or more applications and an operating system. Hardware can include, but is not limited to, a processor, memory and user interface display.

A. Processing Redirect Events

Figure 2A:
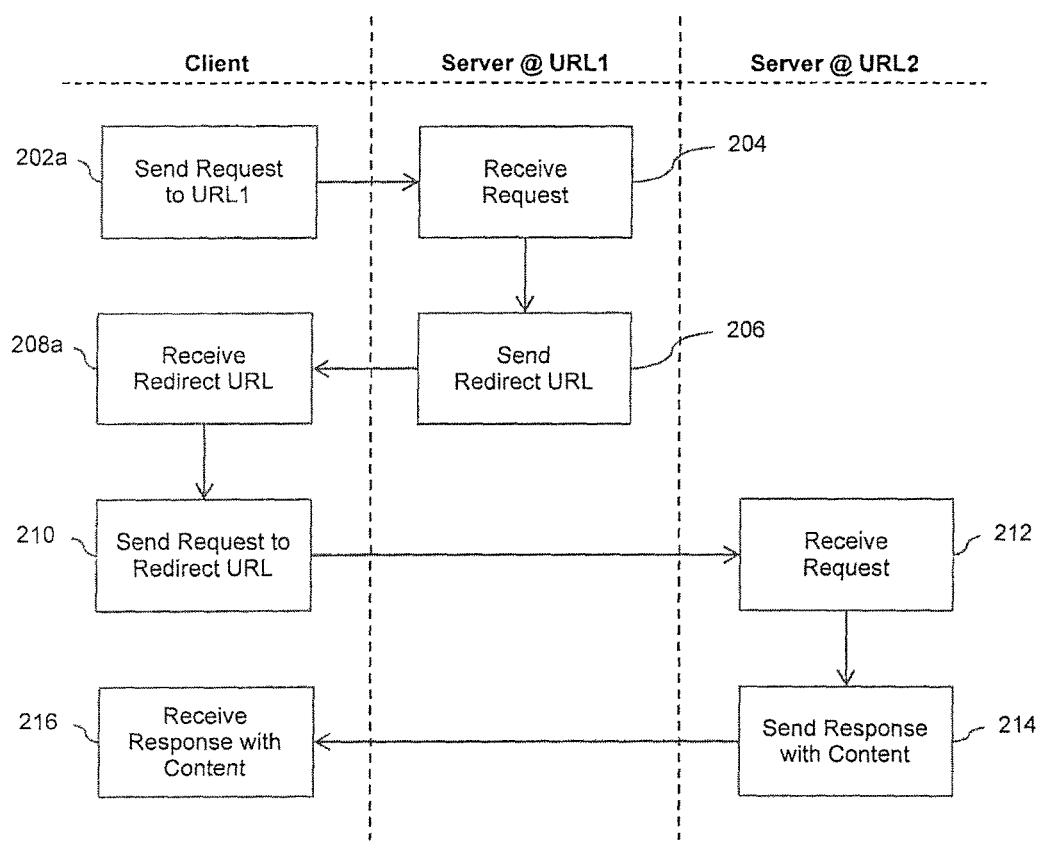
FIG. 2A is a flowchart illustrating a method known in the art for processing a redirect event.
Figure 2B:
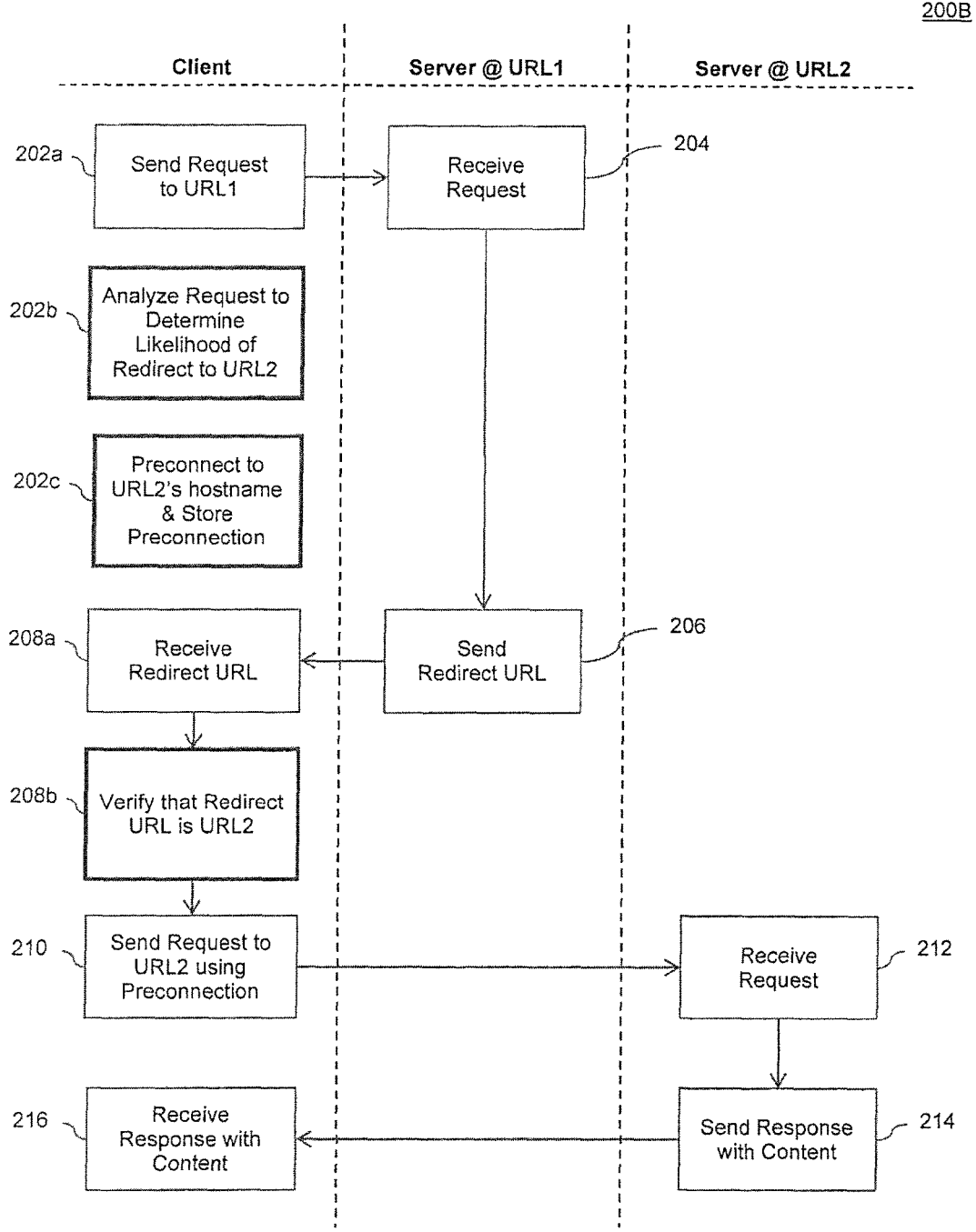
FIG. 2B is a flowchart illustrating an exemplary method for processing a redirect event according to one embodiment.

FIGS. 2A and 2B are flowcharts illustrating two different methods for processing redirect events. FIG. 2A illustrates the steps taken by systems known in the art for processing redirect events. FIG. 2B, however, illustrates the steps taken by system 100 for processing redirect events, according to one embodiment.

Redirect events may be generated though several methods. In one embodiment, a server may utilize an HTTP status code to generate a redirect event. In another embodiment, a server may utilize a server-side script that generates an HTTP header. In a further embodiment, a webpage may utilize an HTTP refresh header or refresh meta tag. Other methods for generating redirect events will be ready known and understood by one of skill in the art. These methods for generating redirect events are not intended to limit the embodiments in any way.

FIG. 2A illustrates a method currently known in the art for processing redirect events. A client browser may be utilized to navigate to a website hosted on a server located at a URL, URL1, for example. In response to receiving a request for data from the client browser (steps 202a, 204), the server may deliver a redirect event (step 206). Once the redirect event is received from the server (step 208a), the client browser will connect to the server located at the URL hostname specified by the redirect event, for example, URL2, and send a request for data (step 208). In response to the request, URL2 may deliver data that includes content or another redirect event (steps 212, 214). The client browser will receive and process the data received from URL2 accordingly (step 216).

The method described in FIG. 2B, however, modifies the method described in FIG. 2A with additional steps that reduces latency in processing redirect events. In one embodiment, while the client browser requests data from the server located at URL1 (step 202a), the client browser analyzes URL1 and determines the likelihood of a redirect event occurring. To determine whether a redirect event is likely, the client browser attempts to locate a stored key-value pair corresponding to at least URL1's hostname (step 202b). Key-value pairs can include a combination of at least a source URL hostname and at least a target URL hostname. Key-value pairs are described in more detail below. If a key-value pair that corresponds to URL1 is located, the client browser will initiate a preconnection to the target URL's hostname (step 202c).

While the client browser is completing steps 202a-c, the server at URL1 receives the request (step 204) and responds by sending a redirect event along with a redirect URL (step 206). Once the redirect event and redirect URL are received (step 208a), the client browser compares at least the redirect URL's hostname to at least the target URL's hostname (step 208b). If the hostnames are similar, the client browser will use the preconnection to process the redirect URL (step 210). If the hostnames are not similar, the redirect URL may be stored as a target URL along with the source URL and a probability factor in a new key-value pair.

The method in FIG. 2B can reduce latency in redirect navigation due to processing anticipated redirect events in parallel to, and/or prior to actually receiving a redirect event. This method, however, is not intended to limit the embodiments in any way.

B. Client Browser

Returning back to FIG. 1, client browser 101 can be a web browser or any other software application capable of allowing a user to view and/or download content from a website over a network such as the Internet. Websites may be retrieved using uniform resource identifiers ("URI"). URIs can include uniform resource locators ("URL") and uniform resource names ("URN"). Additionally, the Internet Protocol ("IP") address of a computer system serving the website may be used in conjunction with a URI or a URL. The embodiments described herein make reference to using URLs, but alternative embodiments may utilize other types of URIs as well.

Client browser 101 may use a number of standards or schemes to request data from a website in conjunction with a URL. Such standards and schemes can include, for example, the Hypertext Transfer Protocol (HTTP), the Hypertext Transfer Protocol Secure (HTTPS), or the File Transfer Protocol (FTP).

In connecting to a website, client browser 101 may perform three "round-trips." Each round-trip includes sending data to a server and receiving a response. The first round-trip occurs when a hostname is sent to a DNS server in order to resolve the hostname into an IP address. The second round-trip occurs when a connection is established with a server located at the hostname. The third round-trip occurs when content is requested from the server. Because each round-trip will occur at least twice when a redirect URL is encountered, a user may experience an undesirable period of delay. Thus, the embodiments herein seek to reduce the latency between redirect events by configuring client browser 101 to speculatively preconnect to an anticipated redirect URL hostname while a redirect event is being received from the server.

1. Monitor Module

Client browser 101 includes monitor module 103. Monitor module 103 is configured to monitor a network data stream for a request to a URL. Monitor module 103 may then pass this monitored URL to redirect speculation module 102. The network data stream, for example, can include data sent or received by client browser 101 over a network. In one embodiment, monitor module 103 passively monitors the network data stream for a URL and passes the URL to redirect speculation module 102. In some embodiments, monitor module 103 only passes a URL to redirect speculation module 102 when it encounters a new or different hostname. In other embodiments, monitor module 103 may monitor for only hostnames or hostnames and paths. These embodiments, however, are not intended to limit the embodiments described herein.

2. Redirect Speculation Module

Client browser 101 further includes redirect speculation module 102. Redirect speculation module 102 is configured to retrieve a one or more redirect speculation values based on a URL received from monitor module 103. Each redirect speculation value includes a key-value pair consisting of at least a source URL hostname, at least a target URL hostname, and a probability factor. Redirect speculation module 102 may retrieve the redirect speculation values having at least a source URL hostname that match the source URL hostname received from monitor module 103.

In some embodiments, redirect speculation module 102 may then analyze the probability factors associated with each retrieved redirect speculation value to determine at least the target URL hostname that will most likely match an anticipated redirect URL hostname. Once the probability factors are analyzed, the selected target URL is made available to preconnect module 104.

In other embodiments, a redirect speculation value may consist only of a key-value pair. In these embodiments, once a redirect speculation value corresponding to the source URL is retrieved, the associated target URL is made available to preconnect module 104.

Redirect speculation values may be stored at redirect speculation database 106. Redirect speculation database 106 can be configured to store one or more redirect speculation values for each source URL. This is described in greater detail below.

In some embodiments, redirect speculation module 102 may also be configured to set or modify probability factors. For example, a probability factor may be modified each time its corresponding redirect speculation value is retrieved or each time a redirect event is received from its corresponding source URL hostname. These and other modification examples are described in greater detail below.

a. Redirect Speculation Values

Redirect speculation values may be maintained for any number of source URLs. Additionally, more than one redirect speculation value can exist for one source URL. Each redirect speculation value may include a source URL and a redirect URL. This combination may also be referred to as a "key-value pair." A redirect speculation value may also include a probability factor or other data elements that describe the relationship between a key-value pair.

URLs can include three parts—a scheme, a host, and, optionally, a path. Each source and target URL stored in a key-value pair must include at least a host. Key-value pairs, though, may also include a scheme and/or a path. For example, a source URL in a key-value pair may consist of a scheme and a host, otherwise known as a "scheme-host pair." Alternatively, for example, the source URL may consist of just a host while the target URL consists of a scheme-host pair. The table below describes other exemplary combinations using a source URL of "http://a/path1" and a target URL of "http://b/path2":

| KEY | | | VALUE | | |
|---|---|---|---|---|---|
| SCHEME | HOST | PATH | SCHEME | HOST | PATH |
| http:// | a | path 1 | http:// | b | path2 |
| http:// | a | path 1 | http:// | b | |

| KEY | | | VALUE | | |
|---|---|---|---|---|---|
| SCHEME | HOST | PATH | SCHEME | HOST | PATH |
| http:// | a | path 1 | | b | |
| http:// | a | | http:// | b | path2 |
| | a | | http:// | b | |
| | a | | | b | |

Further canonicalization of URLs may be maintained for each key-value pair as one of skill in the art will readily understand, given this description.

Redirect speculation values may be stored, for example, in redirect speculation database 106. Alternatively, redirect speculation values may be stored, for example, in a table that maps each unique source URL to one or more observed target URLs. The table can be maintained within client browser 101 or may be stored in a separate file.

Client browser 101 may also obtain redirect speculation values from, for example, a server over a network. The third party may maintain a database of redirect speculation values hosted on the server. The redirect speculation values obtained from the third party may also include probability factors for one or more of the redirect speculation values. Probability factors are described in more detail below.

In some embodiments, a third party can maintain a database of redirect speculation values. The redirect speculation values may be collection from a web crawler or one or more additional client browsers. If redirect speculation values are collection from one or more client browsers, users may choose whether or not to provide the data. Client browser 101 may then, for example, retrieve one or more redirect speculation values from the server. For example, client browser 101 may connect to a server providing redirect speculations values and retrieve one or more values. The values may be retrieved, for example, based on the hostnames most visited by a user. The values may also be retrieved, for example, based on the user's browsing history or bookmarked URLs. Other basis for retrieving redirect speculation values from a third party will be readily understood by one of skill in the art.

b. Probability Factor

A probability factor represents a likelihood that visiting a source URL will result in being redirected to a target URL. Probability factors may be associated with key-value pairs that can consist of a source URL and a target URL. Each key-value pair and an associated probability factor can be stored in, for example, a mapping table or database. In one embodiment, the database or mapping table can be organized by source URL. In another embodiment, if more than one key-value pair exists for a source URL, the database or mapping table can be organized by source URL and its associated probability factor.

A probability factor may be modified using a number of different methods. For example, if a probability factor represents an estimate of the likelihood that "http://example.com" will redirect to "http://www.example.com," the probability factor may be modified each time the redirect occurs. Alternatively, probability factors can be dynamically modified or can be generated by a third-party provider.

In one embodiment, a probability factor is dynamically modified each time a key-value pair is traversed due to actual observed redirect events. For example, a one or a zero value may be averaged into the probability factor depending on whether a redirect was applied from the source URL to the target URL. Averaging a value into the probability factor may include, for example, taking a weighted average of the previous probability factor with the new value.

In another embodiment, a probability factor may be dynamically modified based on distinct events, such as if a source URL is followed or if a target URL hostname is processed as a consequence of navigating to the source URL. For example, each time a key-value pair is traversed due to navigating to a source URL, the probability factor may be decreased by an amount, such as, for example, by half. Alternatively, each time a redirect event is encountered, probability factor associated with the target URL may be increased by an amount, such as, for example, by 0.5.

In another embodiment, a third-party may crawl URLs and store source and target URLs for each encountered redirect event. This data can then be distributed to client browser 101 and used either in place of or alongside similar data collected and maintained by client browser 101.

A probability factor may also be used to determine whether an action, such as, for example, a preconnection, should be established to the target URL's hostname. In one embodiment, each time a source URL is visited, redirect speculation module 102 will traverse each redirect speculation value for one or more key-value pairs that correspond to the source URL. If at least one key-value pair is located, the probability factor associated with the key-value pair will be analyzed to determine if a preconnection should be established to the target URL's hostname in the key-value pair.

In another embodiment, an action may be taken if a probability factor associated with a source URL is above a threshold. Actions may include, for example, resolving the target URL's hostname for the specified scheme via a Domain Name System (DNS) or initiating a TCP/IP connection to the target URL's hostname using the port associated with a specified scheme. For example, a probability factor may exceed a threshold thereby indicating that a redirection event will occur. If the probability factor exceeds, for example, a 30% probability, client browser 101 may perform a DNS pre-resolution of the target URL's hostname. If the probability factor exceeds, for example, a 65% probability, client browser 101 may also establish a TCP/IP preconnection to the target URL's hostname.

While the probability factors listed above are represented in percentage values, probability factors may also be represented in other forms. For example, a probability factor may represent the number of redirect events that have been observed for each navigation to the source URL, such as 30 out of 100 navigation. Probability factors may also include metrics that vary in relationship to the probability or expectation metrics, or that asymptotically converge over time towards a related estimation value.

The embodiments described above are not intended to limit the scope of this disclosure. Based on the foregoing description, a person skilled in the art will recognize other techniques that may be used to modify a probability factor to provide desired results.

3. Preconnect Module

Client browser 101 further includes preconnect module 104. Preconnect module 104 is configured to initiate a preconnection to a selected target URL's hostname. In one embodiment, preconnect module 104 may establish a preconnection to a target URL's hostname when redirect speculation module 102 provides an instruction to preconnect. In another embodiment, preconnect module 104 may establish a preconnection upon receiving a target URL's hostname.

Preconnections may be established while client browser 101 resolves, connects to, and/or retrieves data from a source URL. Thus, the preconnection may be performed at substantially the same time, or in parallel to navigating to the source URL. Once established, a preconnection may be utilized by client browser 101 to process a redirect URL received from navigating to the source URL. While some preconnections may not be utilized due to various factors, users may still observe less latency in redirect events by using preconnections for anticipated redirect events.

Preconnections may include one or more steps involved in establishing a connection. For example, a preconnection may include performing a DNS lookup for a hostname. A preconnection may also include, for example, establishing a TCP/IP network connection by transmitting a SYN packet to a server and receiving a SYN-ACK from the server.

In one embodiment, a preconnection includes transmitting a SYN packet to a server, receiving a SYN-ACK from the server, and transmitting an ACK to the server in response to the SYN-ACK.

In another embodiment, a preconnection includes receiving a SYN-ACK from a server but waiting to transmit an ACK in response to the SYN-ACK. The ACK may be transmitted once a redirect event to the URL hostname is verified. This allows the server to use its resources at a later point in time to service the request. Additionally, this embodiment may enhance compatibility with some servers. For example, a server may terminate idle connections after a period of inactivity. This period of inactivity may be monitored by a timer set by the server once resources start being consumed. For example when resources are consumed, the server may start a timer that drops a connection if a request, such as an HTTP GET request, is not received from client browser 101 within a defined timeframe. Thus, delaying the sending of the ACK may prevent the server from dropping the preconnection. Additionally, a server may not reserve buffer memory for inbound data until it receives a ACK. Thus, overall network congestion may be decreased such that other users may experience less latency.

In another embodiment, a preconnection also includes using the preconnection to retrieve data once it is established. For example, in an HTTP web connection, a preconnection may include transmitting an HTTP request (e.g., GET request). The HTTP request may be a valid request or a dummy request to warm up the server.

In another embodiment, a preconnection may include one or more steps required to establish a secure connection to a hostname. Secure connections may utilize security protocols such as, for example, Secure Sockets Layer (SSL). Opening a secure connection to a hostname may incur as many as four round-trips including: (1) performing a DNS lookup; (2) setting up a preconnection; (3) establishing a session key; and (4) responding to messages. Additional round-trips may also be necessary. Consequently, multiple round-trips to establishing a secure preconnection consumes both client and server resources. Thus, to reduce resource consumption, a session key may be shared across multiple secure preconnections.

In another embodiment, one or more secure preconnections may be established using session keys that are shared across the secure preconnections. For example, a user may navigate to a secure source URL that generates a redirect event to a secure redirect URL. When this occurs, both the connection to the source URL and the preconnection to the target URL's hostname may utilize a shared session key. In another example, a user may navigate to a secure source URL that generates a redirect event to a secure redirect URL. Navigating to the secure redirect URL may also generate a redirect event. When this occurs, a shared session key may be utilized for each connection.

4. Connect Module

Client browser 101 further includes connect module 105. Connect module 105 is configured to receive and process a response from a source URL. If the response includes a redirect event, connect module 105 is also configured to use a preconnection to process the redirect URL.

In one embodiment, the preconnection is used if the redirect URL's host matches the host of the target URL used to establish the preconnection. In another embodiment, the preconnection is used despite the redirect URL and the target URL having different paths. In another embodiment, the preconnection is used only if the redirect URL and target URL have matching schemes.

These embodiments are provided as examples and are not intended to be limiting in any way. One of skill in the art will readily understand whether the use the preconnection based on comparing the URL hostnames.

C. Website and Redirect Website

System 100 includes website 110 and redirect website 120 that are connected to client browser 101. Website 110 and redirect website 120 can be, for example, a telecommunications server, a web server, or any type of database server. A web server may contain web applications which generate content in response to a URL request. URL requests can use a number of protocols including, for example, HTTP, HTTPS, or FTP.

Website 110 and redirect website 120 can connect to client browser 101 via any network or combination of networks that can carry data communication. These networks can include, for example, a local area network (LAN) or a wide area network (WAN). LAN and WAN networks can include any combination of wired (e.g., Ethernet) or wireless (e.g., Wi-Fi or 3G) network components.

D. Other Embodiments

While system embodied in FIG. 1 shows client browser 101 including redirect speculation module 102, monitor module 103, preconnect module 104, and connect module 105, client browser can include more or less modules. Additionally, client browser 101 may include a combination of the modules described above. Further, the embodiment in system 100 may be optionally included into client browser 101 as a plug-in type module.

Other embodiments may also include adaptive speculative preconnection for subresources delivered as a part of the content received from a website. Additional features that may be included in the embodiments described herein are described in U.S. patent application Ser. No. 13/175,715, filed Jul. 1, 2011, which is incorporated herein by reference.

Various aspects of embodiments described herein can be implemented by software, firmware, hardware, or a combination thereof. The embodiments, or portions thereof, can also be implemented as computer-readable code. For example, monitor module 103, redirect speculation module 102, preconnect module 104, and connect module 105 may be implemented in a computer system using software, firmware, hardware, tangible computer-readable media having instructions stored thereon, or a combination thereof, and may be implemented in one or more computer systems or other processing systems. The embodiment in system 100 is not intended to be limiting in any way.

Example Method Embodiments

Figure 3:
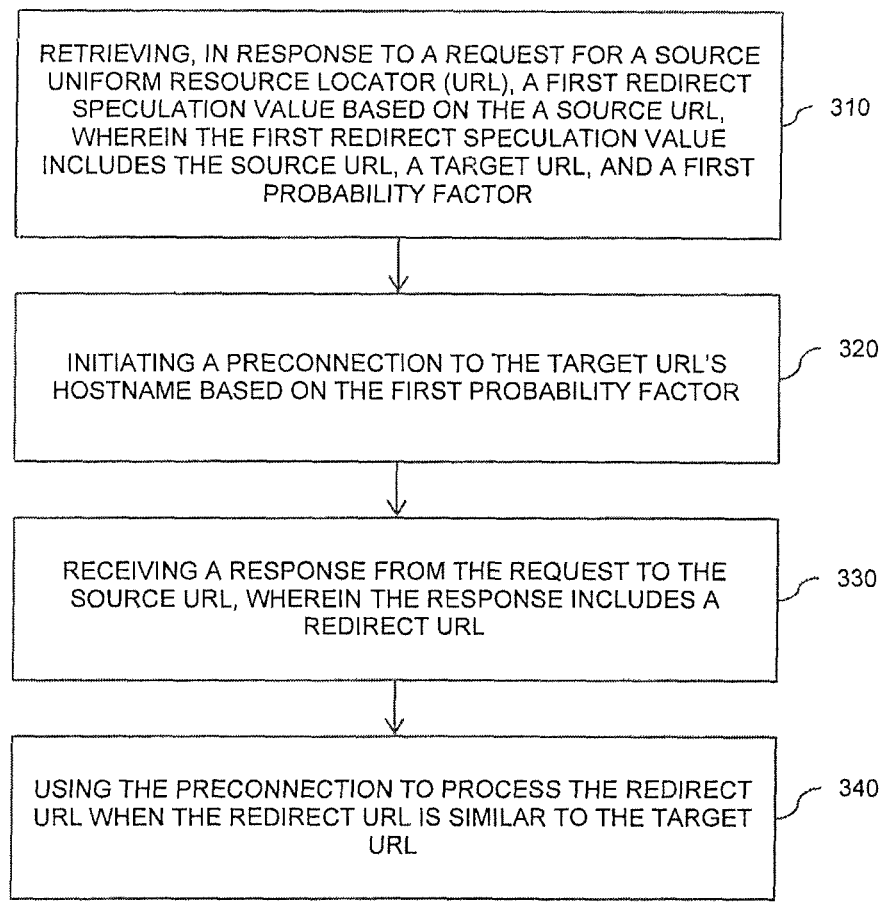
FIG. 3 is a flowchart illustrating an exemplary method for reducing redirect latency by speculatively preconnecting to a URL's hostname.

FIG. 3 is a flowchart illustrating an exemplary method for reducing redirect latency by speculatively preconnecting to a URL hostname. While method 300 is described with respect to one embodiment, method 300 is not meant to be limiting and may be used in other applications. Method 300 may be carried out by system 100, for example.

Method 300 retrieves, in response to a request for a source URL, a redirect speculation value based on the source URL. The redirect speculation value includes the source URL, a target URL, and a probability factor (step 310). Step 310 may be carried out by redirect speculation module 102 embodied in system 100, for example.

Once the redirect speculation value has been located, a preconnection to the target URL's hostname is initiated based on the probability factor (step 320). In one embodiment, multiple redirect speculation values may exist for the source URL. Thus, the probability factor indicating the greatest likelihood of using a preconnection may be utilized. Step 320 may be carried out by preconnect module 104 embodied in system 100, for example.

Finally, a response is received from the source URL. The response is analyzed to determine if a redirect event is included (step 330). If a redirect event is included, the redirect URL's hostname is compared with the target URL's hostname. If the hostnames are similar, the preconnection is used to process the redirect URL (step 340). In one embodiment, hostnames are similar if at least the host included in each hostname matches. If, the hostnames are not similar, the source and redirect URLs may be stored in new redirect speculation on a database. The new redirect speculation value can also include a probability factor. Steps 330 and 340 may be carried out by connect module 105 embodied in system 100, for example.

Operations for the above-described embodiments may be further described with reference to one or more logic flows. It will be appreciated that the representative logic flows do not necessarily have to be executed in the order presented or in any particular order. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Example Computer System

Figure 4:
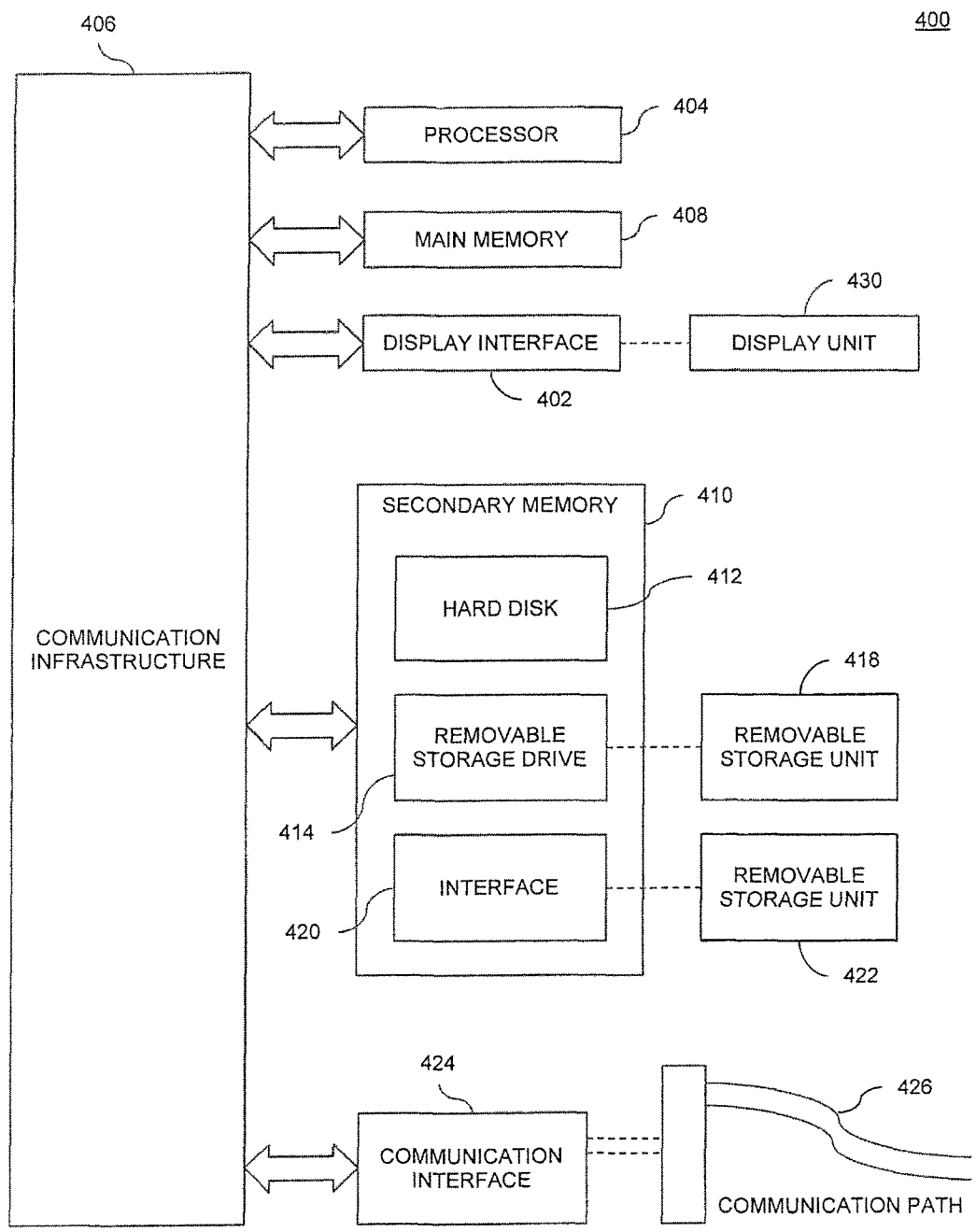
FIG. 4 is a system diagram that can be used to implement embodiments described herein.

FIG. 4 illustrates an example computer system 400 in which embodiments of the present disclosure, or portions thereof, may be implemented. For example, client browser 101, including redirect speculation module 102, monitor module 103, preconnect module 104, and connect module 105, may be implemented in one or more computer systems 400 using hardware, software, firmware, computer readable storage media having instructions stored thereon, or a combination thereof.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 400. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 404 may be a single processor in a multi-core/multiprocessor system, such system operating alone, or in a cluster of computing devices operating in a cluster or server farm. Processor device 404 is connected to a communication infrastructure 406, for example, a bus, message queue, network, or multi-core message-passing scheme.

Computer system 400 also includes a main memory 408, for example, random access memory (RAM), and may also include a secondary memory 410. Secondary memory 410 may include, for example, a hard disk drive 412, removable storage drive 414. Removable storage drive 414 may include a floppy disk drive, a magnetic tape drive, an optical disk drive, a flash memory, or the like. The removable storage drive 414 reads from and/or writes to a removable storage unit 418 in a well-known manner. Removable storage unit 418 may include a floppy disk, magnetic tape, optical disk, flash drive, etc. which is read by and written to by removable storage drive 414. As will be appreciated by persons skilled in the relevant art, removable storage unit 418 includes a computer readable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 418, removable storage unit 422, and a hard disk installed in hard disk drive 412. Computer storage medium and computer readable storage medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement the embodiments described herein. In particular, the computer programs, when executed, enable processor device 404 to implement the processes of the embodiments, such as the stages in the methods illustrated by flowchart 200B of FIG. 2B, discussed above. Accordingly, such computer programs represent controllers of computer system 400. Where an embodiment is implemented using software, the software may be stored in a computer storage medium and loaded into computer system 400 using removable storage drive 414, interface 420, and hard disk drive 412, or communications interface 424.

Embodiments of the invention also may be directed to computer program products including software stored on any computer readable storage medium. Such software, when executed in one or more data processing device, causes a data processing device(s) to operate as described herein. Embodiments of the invention employ any computer useable or readable storage medium. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments of the present invention as contemplated by the inventor(s), and thus, are not intended to limit the present invention and the appended claims in any way.

The foregoing description of the specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A computer-implemented method for reducing navigation redirect latency by using speculative preconnection comprising:
retrieving, in response to a request for a source Uniform Resource Locator (URL), a first redirect speculation value based on the source URL, wherein the first redirect speculation value includes the source URL, a target URL, and a first probability factor;
initiating a preconnection to the target URL's hostname when the first probability factor exceeds a threshold;
receiving a response to the request for the source URL, wherein the response includes a redirect URL; and
using the preconnection to process the redirect URL when the redirect URL is similar to the target URL.

2. The computer-implemented method of claim 1, wherein the initiating the preconnection further comprises:
performing a first preconnection action when the first probability factor exceeds a first threshold; and
performing a second preconnection action when the first probability factor exceeds a second threshold.

3. The computer-implemented method of claim 2, wherein the first preconnection action comprises resolving the target URL's hostname via a Domain Name System (DNS).

4. The computer-implemented method of claim 2, wherein the second preconnection action comprises initiating a TCP/IP connection to the target URL's hostname.

5. The computer-implemented method of claim 1, further comprising:
creating a second redirect speculation value when the redirect URL is not similar to the target URL, wherein the second redirect speculation value includes the source URL, the redirect URL, and a second probability factor; and
storing the second redirect speculation value.

6. The computer-implemented method of claim 1, further comprising:
modifying the first probability factor based on a similarity between the redirect URL and the target URL.

7. The computer-implemented method of claim 1, further comprising:
modifying the first probability factor by a value based on navigating to the redirect URL.

8. The computer-implemented method of claim 1, further comprising:
receiving the first probability factor from a third-party provider.

9. A system for reducing navigation redirect latency by using speculative preconnection comprising:
a redirect speculation module, implemented on at least one processor, configured to retrieve, in response to a request for a source Uniform Resource Locator (URL), a first redirect speculation value based on the source URL, wherein the first redirect speculation value includes the source URL, a target URL, and a first probability factor;
a preconnect module configured to initiate a preconnection to the target URL's hostname when the first probability factor exceeds a threshold; and
a connect module configured to:
receive a response from the request to the source URL, wherein the response includes a redirect URL; and
use the preconnection to process the redirect URL when the redirect URL is similar to the target URL.

10. The system of claim 9, the preconnection module is further configured to:
perform a first preconnection action when the first probability factor exceeds a first threshold; and
perform a second preconnection action when the first probability factor exceeds a second threshold.

11. The system of claim 10, wherein the first preconnection action comprises resolving the target URL's hostname via a Domain Name System (DNS).

12. The system of claim 10, wherein the second preconnection action comprises initiating a TCP/IP connection to the target URL's hostname.

13. The system of claim 9, the redirect speculation module is further configured to:
create a second redirect speculation value when the redirect URL is dissimilar to the target URL, wherein the second redirect speculation value includes the source URL, the redirect URL, and a second probability factor; and
store the second redirect speculation value.

14. The system of claim 9, wherein the redirect speculation module is further configured to modify the first probability factor based on a similarity between the redirect URL and the target URL.

15. A non-transitory computer-readable medium storing instructions executable by at least one processor for reducing navigation redirect latency by using speculative preconnection, the instructions configured to cause the at least one processor to:
retrieve, in response to a request for a source Uniform Resource Locator (URL), a first redirect speculation value based on the source URL, wherein the first redirect speculation value includes the source URL, a target URL, and a first probability factor;
initiate a preconnection to the target URL's hostname when the first probability factor exceeds a threshold;
receive a response from the request to the source URL, wherein the response includes a redirect URL; and
use the preconnection to process the redirect URL when the redirect URL is similar to the target URL.

16. The computer-readable medium of claim 15, wherein the initiate the preconnection further comprises:
perform a first preconnection action when the first probability factor exceeds a first threshold; and
perform a second preconnection action when the first probability factor exceeds a second threshold.

17. The computer-readable medium of claim 16, wherein the first preconnection action comprises resolving the target URL's hostname via a Domain Name System (DNS).

18. The computer-readable medium of claim 16, wherein the second preconnection action comprises initiating a TCP/IP connection to the target URL's hostname.

19. The computer-readable medium of claim 15, wherein the instructions are further configured to:
create a second redirect speculation value when the redirect URL is dissimilar to the target URL, wherein the second redirect speculation value includes the source URL, the redirect URL, and a second probability factor; and
store the second redirect speculation value.

20. The computer-readable medium of claim 15, wherein the instructions are further configured to:
    modify the first probability factor based on a similarity between the redirect URL and the target URL.

\* \* \* \* \*